US008081991B2

(12) United States Patent
Males et al.

(10) Patent No.: US 8,081,991 B2
(45) Date of Patent: Dec. 20, 2011

(54) WIRELESS BASED POSITIONING METHOD AND APPARATUS

(75) Inventors: Jared R. Males, Tucson, AZ (US); Gary C. Worrell, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 349 days.

(21) Appl. No.: 12/434,085

(22) Filed: May 1, 2009

(65) Prior Publication Data

US 2009/0280835 A1 Nov. 12, 2009

Related U.S. Application Data

(60) Provisional application No. 61/050,641, filed on May 6, 2008.

(51) Int. Cl.
*H04W 24/00* (2009.01)
(52) U.S. Cl. ............... 455/456.5; 455/456.2; 455/456.1; 370/338; 370/331
(58) Field of Classification Search .... 455/456.1–456.6, 455/404.2
See application file for complete search history.

(56) References Cited

U.S. PATENT DOCUMENTS

| | | | |
|---|---|---|---|
| 6,161,018 A | 12/2000 | Reed et al. | |
| 6,259,406 B1 | 7/2001 | Sugiura et al. | |
| 6,529,164 B1 | 3/2003 | Carter | |
| 6,674,403 B2 | 1/2004 | Gray et al. | |
| 6,799,047 B1 | 9/2004 | Bahl et al. | |
| 7,129,886 B2 | 10/2006 | Hall et al. | |
| 7,130,646 B2 * | 10/2006 | Wang | 455/456.5 |
| 7,231,186 B2 * | 6/2007 | Namiki | 455/67.11 |
| 7,312,752 B2 | 12/2007 | Smith et al. | |
| 7,339,524 B2 | 3/2008 | Zimmerman et al. | |
| 7,339,525 B2 | 3/2008 | Zimmerman et al. | |
| 7,339,526 B2 | 3/2008 | Zimmerman | |
| 7,342,538 B2 | 3/2008 | Zimmerman | |
| 2006/0217132 A1 * | 9/2006 | Drummond-Murray et al. | 455/456.2 |
| 2007/0081496 A1 * | 4/2007 | Karge et al. | 370/331 |
| 2007/0201421 A1 * | 8/2007 | Huseth | 370/338 |
| 2009/0247147 A1 * | 10/2009 | Hadinata et al. | 455/421 |

OTHER PUBLICATIONS

Jared R. Males, QPS: An 802.11 Wireless LAN Based Positioning System with No RF Mapping or Fingerprinting, Draft JHU/APL Proprietary, Jun. 26, 2008, 1-13.
Fredrik Gustafsson and Fredrik Gunnarsson, Mobile Positioning Using Wireless Networks [Possibilities and fundeamental limitations based on available wireless network measurements], IEEE Signal Processing Magazine [pp. 41-53] Jul. 2005.
Guolin Sun, Jie Chen, Wei Guo, and K.J. Ray Liu, Signal Processing Techniques in Network-Aided Positioning [A survey of state-of-the-art positioning designs], IEEE Signal Processing Magazine, [pp. 12-23], Jul. 2005.
Neal Patwari, Joshua N. Ash, Spyros Kyperountas, Alfred O. Hero III, Randolph L. Moses, and Neiyer S. Correal, Locating the Nodes [Cooperative localization in wireless sensor networks], IEEE Signal Processing Magazine [pp. 54-69], Jul. 2005.

(Continued)

*Primary Examiner* — Jinsong Hu
*Assistant Examiner* — Benjamin Morales Fernandez
(74) *Attorney, Agent, or Firm* — Aisha Ahmad

(57) ABSTRACT

A system and method is described herein to determine the physical location of a user within an edifice. At least three wireless access points, for example, 802.11 nodes, receives and transmits information to a handheld device in order to determine the location information.

3 Claims, 3 Drawing Sheets

OTHER PUBLICATIONS

Teemu Roos, Petri Myllymaki, and Henry Tirri, A Statistical Modeling Approach to Location Estimation, IEEE Transactions on Mobile Computing, vol. 1, No. 1, pp. 59-69, Jan.-Mar. 2002.

Jianping Pan, Thomas Hou, Yi Shi, and Sherman X. Shen, Optimal Base-Station Locations in Two-Tiered Wireless Sensor Networks,IEEE Transactions on Mobile Computing, vol. 4, No. 5, Sep./Oct. 2005, pp. 458-473.

Ali H. Sayed, Alirez Tarighat, and Nima Khajehnouri, Network-Based Wireless Location [Challenges faced in developing techniques for accurate wireless location information], IEEE Signal Processing Magazine [pp. 24-40], Jul. 2005.

Chih-Yu Lin, Wen-Chin Peng, and Yu-Chee Tseng, Efficient In-Network Moving Object Tracking in Wireless Sensor Networks, IEEE Transactions on Mobile Computing, vol. 5, No. 8, pp. 1044-1056, Aug. 2006.

Jaames Aspnes, Tolga Eren, David K. Goldenberg, A. Stephen Morse, Walter Whiteley, Yang Richard Yang, Brian Do. O. Anderson, and Peter N. Belhumeur, A Theory of Network Localization, IEEE Transactions on Mobile Computing, vol. 5, No. 12, pp. 1663-1678, Dec. 2006.

Mike Hazas and Andy Hopper, Broadband Ultrasonic Location Systems for Improved Indoor Positioning, IEEE Transactions on Mobile Computing, vol. 5, No. 5, pp. 536-547, May 2006.

Xiaoyong Chai and Qiang, Reducing the Calibration Effort for Probabilistic Indoor Location Estimation, IEEE Transactions on Mobile Computing, vol. 6, No. 6, pp. 649-662, Jun. 2007.

Kai-Ten Feng, Chao-Lin Chen, and Chien-Hua Chen, Gale: An Enhanced Geometry-Assisted Location Estimation Algorith for NLOS Environments, IEEE Transactions on Mobile Computing, vol. 7., No. 2, pp. 199-213, Feb. 2008.

Baihua Zheng, Wang-Chien Lee, and Dik Lun Lee, On Searching Continuous k Nearest Neighbors in Wireless Data Broadcast Systems, IEEE Transactions on Mobile Computing, vol. 6, No. 7, pp. 748-761, Jul. 2007.

Srdjan Capkun, Kasper Bonne Rasmussen, Mario Cagalj, and Mani Srivastava, Secure Location Verification with hidden and Mobile Base Stations,IEEE Transactions on Mobile Computing, vol. 7, No. 4, pp. 470-483, Apr. 2008.

Location is Everything the benefits of location tracking in WLAN environments, Mar. 2004, An Alcatel Whitepaper, pp. 1-6, Alcatel, 26801 West Agoura Road, Calabasas, CA 91301 USA.

* cited by examiner

WIRELESS BASED POSITIONING METHOD AND APPARATUS

CROSS-REFERENCE TO RELATED APPLICATIONS

This application claims priority to U.S. Provisional Application Ser. No. 61/050,641, filed May 6, 2008, which is incorporated herein by reference in its entirety.

BACKGROUND OF THE INVENTION

1. Field of the Invention

The present invention relates generally to a wireless based positioning method and apparatus that allows a user employing a handheld device to determine his location in a building.

2. Background

The ability to employ wireless network access points, for example 802.11 nodes, to determine a user's position information has been limited. These wireless networks, which are commonly available in most commercial environments, currently have limited use in terms of location determinations because the network users need to access a map or database containing advanced knowledge of the environment. Accordingly, there is a need for a system and method for wireless based positioning within a structure containing a wireless network.

SUMMARY OF THE INVENTION

Embodiments of the present invention satisfy the above need, while providing other advantages. Specifically, embodiments of the present invention allow a user to locate his position information with respect to wireless access nodes within a building, for example.

An embodiment of the present invention includes a method for determining a users position employing a wireless network, comprising:
  providing an edifice containing the wireless network comprised of a plurality of wireless access points throughout the edifice;
  providing a handheld device operable to transmit and receive transmissions from the plurality of wireless access points;
  transmitting location information from the at least three wireless access points to the handheld device;
  receiving said transmitted location information at the handheld device;
  processing said transmitted location information to determine location of said handheld device within the edifice.

Further method, system and apparatus embodiments are apparent from the description below.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE DRAWINGS

Figure 1:
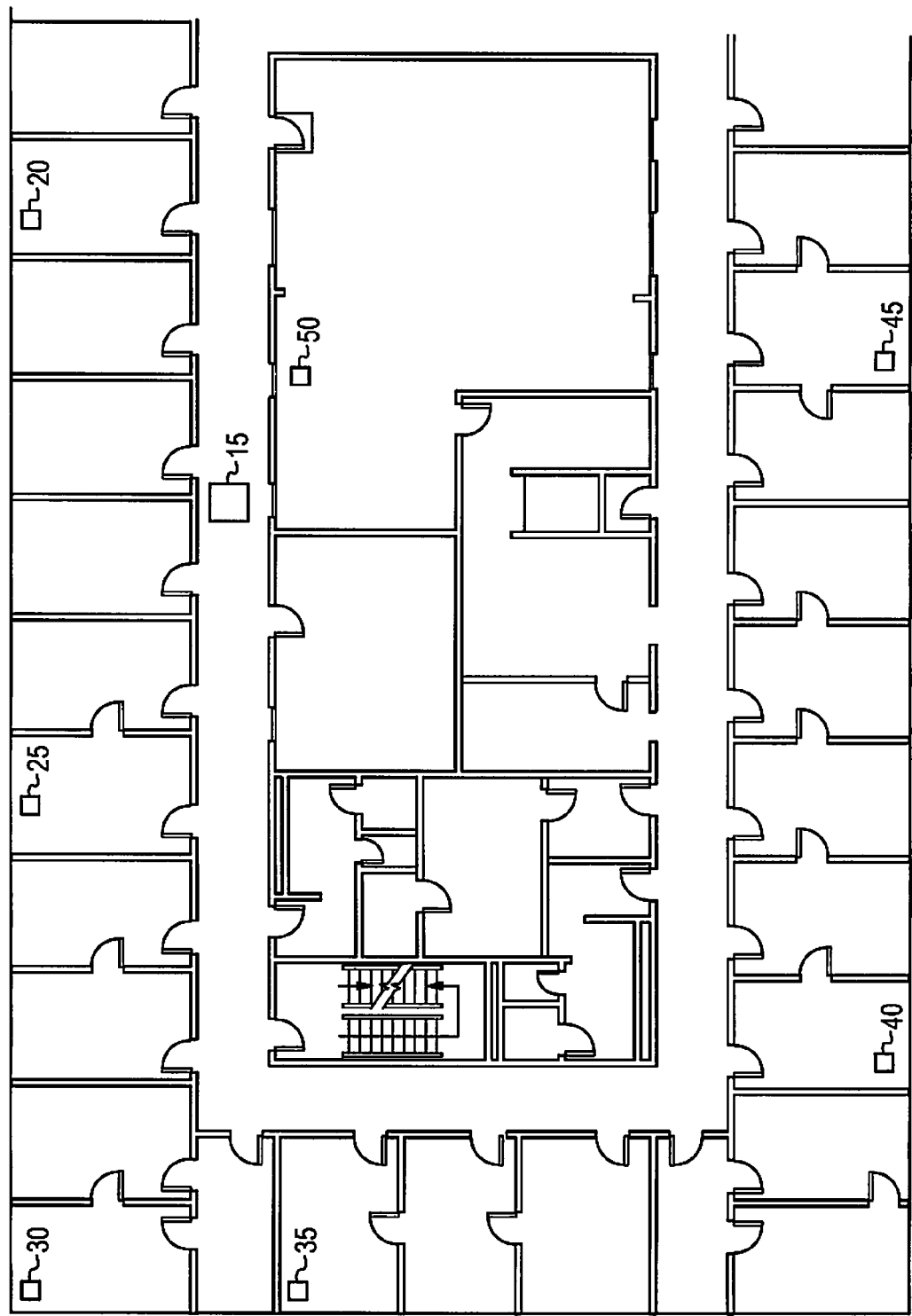
FIG. 1 is an example of a floor plan of a building with wireless network access points and a handheld device operable to locate a users position information with respect to the wireless access points.

FIG. 1 is an example of a floor plan 10 within a building with a plurality of wireless access points (WAP), for example 902.11 nodes, items 20-50 deployed throughout the building. A handheld device 15 can be employed by a user to determine the device 15 positioning throughout the building where there is access to at least three wireless access points.

Outdoors, position information is typically achieved by GPS technology, however, this technology does not function indoors. Several systems exist which use extensive databases of wireless network signal characteristics to determine location, but these cannot be used where there is a lack of a database containing location information or pre-mapped location information. This is the case in buildings or other locations that have not been pre-mapped.

Wireless access nodes employ a protocol such as IEEE 802.11, or "Bluetooth" that allows users to receive and transmit information in an enclosed environment. The wireless access nodes are connected to by user devices, which allows access to the internet or local data services. In addition to the information requested by the user of such devices, the nodes and the connected user devices send and receive information related to the connection, such as the network name (usually called the SSID in the 802.11 protocol), available radio frequencies, available data transfer rates, and security restrictions. This connection related information is transmitted in specific fields of the protocol packets, which are standardized blocks of information organized in specific ways. Such fields could be used to notify user devices of the transmission power and the three dimensional location of the transmitting node, either by adapting existing fields of the protocol (such as the SSID) or using extensions to the protocol.

The present invention employs parameters that each wireless access point (WAP) or 802.11 node can make available, via a field or fields of the protocol, which are the transmitter power and the three dimensional location position of the WAP.

Transmitter power is encapsulated in a parameter, hereinafter referred to as k, which includes the power measured by a protocol compliant device (the Received Signal Strength (RSS) measurement in 802.11) at a known distance from the WAP (e.g. 0.01-3 meters from the transmitter), and the square of said distance. This parameter is encoded in a protocol field transmitted by the WAP Determining k The present invention requires a determination of the k parameter, which is a measure of transmitter power at a fixed distance. This can be achieved by setting the receiver approximately 0.01-3 meters away from each WAP to be used for positioning and taking a set of RSS measurements. This is done for each available transmission power setting available on the WAPs, and the k parameter is determined at a specific distance $d_o$ established by convention, by the formula $k=P(d_o) d_o^2$, where $P(d_o)$ is the RSS value measured at said distance.

WAPs can be deployed on a floor of a building and most are already pre-existing in order to facilitate wireless access to the internet. Thus the present invention can easily be deployed in any commercial environment with WAPs. The WAPs, within their respective subscriber set identifications (SSID), can be programmed to broadcast the value of k and their positions in a local x-y-z coordinate grid.

The three dimensional location position of the WAPs can take the form of either the Cartesian coordinates, typically referred to as X, Y and Z, or the latitude-longitude-elevation (LLE) coordinates used in geographic coordinate systems. The present invention employs two types of coordinate systems. The first is using a local coordinate system, for instance a grid based on the floor plan of a building, as the source of the WAP position. The second mode uses an external coordinate system, such as the World Geodetic System 1984 (WGS-84). The source of these positions may include a geographic survey, the Global Positioning System (GPS), or some other method of position measurement. These parameters (either XYZ or LLE) are encoded in a protocol field transmitted by the WAP.

Figure 2:
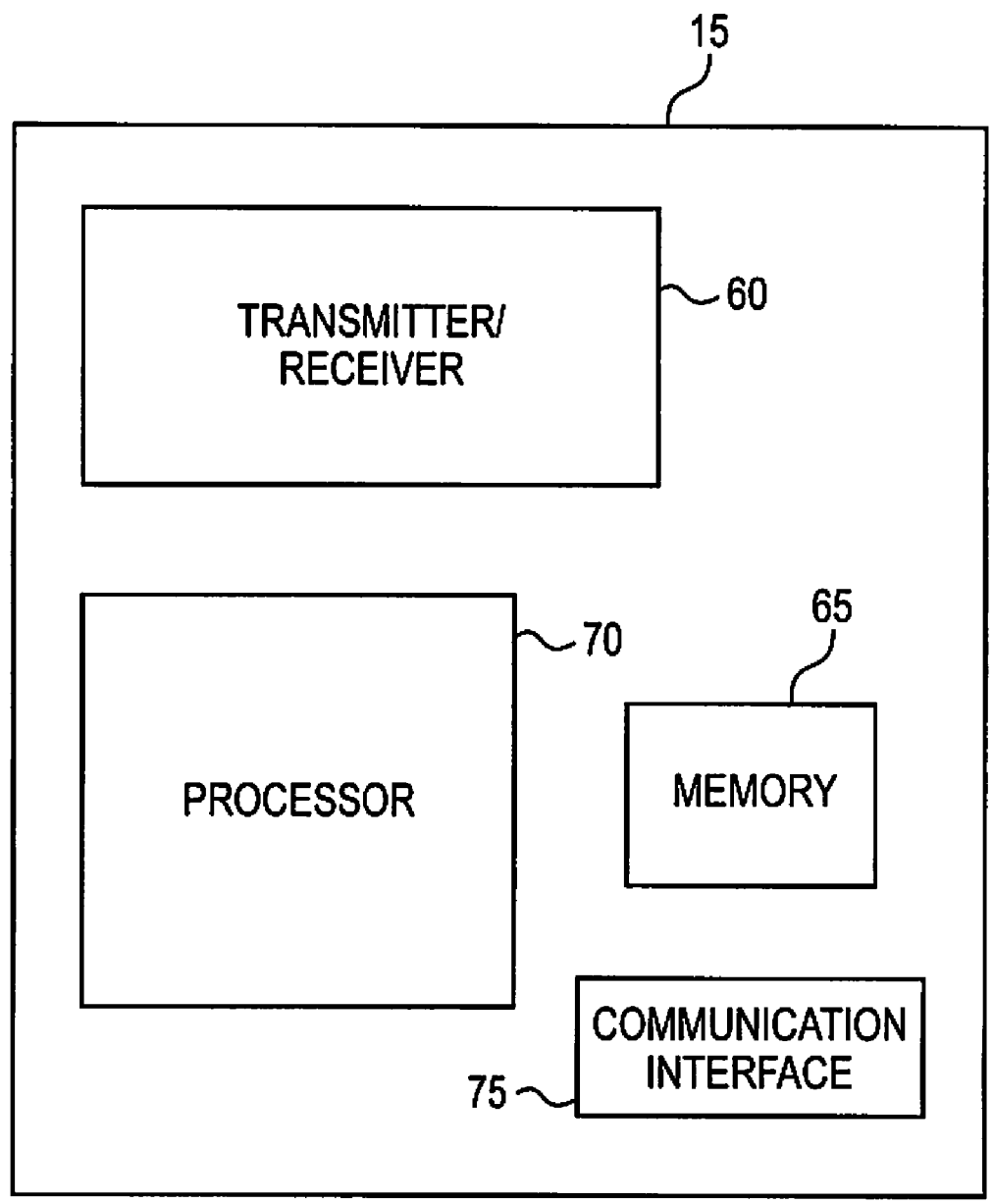
FIG. 2 is an example of a handheld device operable to obtain the position information from the wireless access points.
Figure 3:
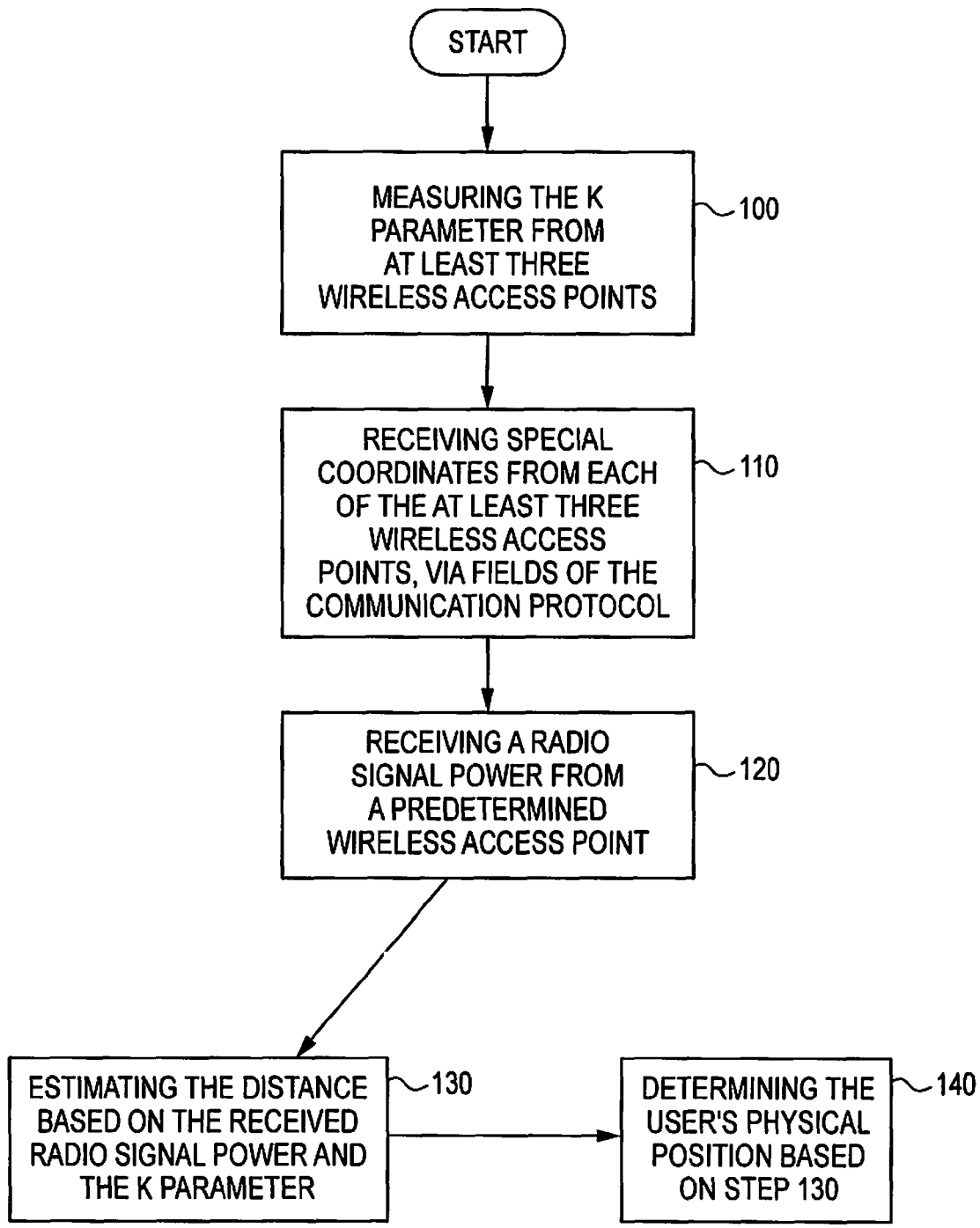
FIG. 3 is an example of a flowchart describing the method of determining a users location information by using a wireless network.

Accordingly, FIG. 2 is an exemplary embodiment of the handheld device 15 used to determine location position information, via a transmitter/receiver 60, operable to transmit and receive information from the handheld device 15 and the WAPs. The processor 70 is employed to process the information received and transmitted, as detailed below, and memory 70 is used to store the processed information. In particular, the computer programs, when executed, enable the processor 70 to implement the method of the present invention as illustrated in FIG. 3, for example, and detailed below. Where the invention is implemented using software, the software may be stored in a computer program product and loaded into a computer system, such as the handheld 70, using memory 65 and a communication interface 75.

FIG. 3 is exemplary of the method employed in the present invention.

Step 100 describes the step of measuring and determining the parameter k as described above, from each of the at least three WAPs.

Step 110 describes the handheld 15 receiving spatial coordinates from each of the at least three WAPs, via fields of the communication protocol Step 120 describes receiving a radio signal power from each of the at least three WAPs, to be used to determine the distance between the handheld 15 and the at least three WAPs being used to determine location position information.

Step 130 describes estimating the distance based on the parameter k, and the measured radio signal power of step 120.

Step 140 determining the users physical position based on the above received information.

The present invention employs a form of lateration that will now be described.

This method uses a novel form of lateration. Three or more spheres of constant ratio of distances, which are the locus of points where the ratio of distances to two points with known three dimensional spatial coordinates is constant, are calculated based on distance estimates to said points. In this method the distance estimates are calculated based on measurements of the received radio signal power from radio transmitters located at known spatial coordinates.

This method of lateration differs from the two previously known and widely used techniques, commonly referred to as trilateration and multilateration, as follows. Trilateration calculates the locus of points of constant distance from a single point with known spatial coordinates, and does so for at least three points. That is trilateration uses the distance estimates directly, without forming their ratio. Multilateration calculates the locus of points with constant difference of distances, which is a hyperboloid, between two points with known spatial coordinates. Multilateration also requires three or more points and associated distance estimates.

This method of lateration, employed in the present invention, is also distinct from what is commonly referred to as triangulation, which determines the angle between a known direction, for example geographic North, and the direction to points with known spatial coordinates.

The present invention employs a wireless network to determine user position with WAPs and a handheld device facilitating the following method.

A wireless network is setup to perform user position estimation using this method consisting of the following.

The method first determines the three dimensional spatial coordinates of each network WAP or transmitter. This can be accomplished using a map, geographic survey, the Global Positioning System (GPS), or building blueprints or floor plans. These coordinates can be relative to a local coordinate system or relative to a global coordinate system such as the WGS-84. If using the method described herein or a system such as GPS, said coordinates could be determined coincidentally with online operation (described below) and updated when changes occur.

The next step of the method includes determining the radio signal power of each of the WAPs or transmitters at a fixed, predetermined distance and determining the parameter $k=P(d_o)d_o^2$, where $P(d_o)$ is the power measured at said distance. This distance is the same for all of the said APs or transmitters. The k value is unique to each AP or transmitter. In 802.11 protocol based devices a typical value of the k parameter is 0.01 milli-Watts for a reference distance of 1 meter. The radio transmitter output power can be changed during online operations (described below), for example to conserve battery power on a mobile network device, and thereby updating the k parameter in real-time. In this case, values of the k parameter for each possible radio transmitter output power are determined in this step.

The next step includes encoding the three dimensional spatial coordinates and the k parameter of each of the WAPs or transmitters in a field or fields of the wireless communication protocol in use. For example in the 802.11 wireless LAN protocol the SSID field can be used.

The next step includes causing each of the WAPs or transmitters to transmit the protocol field or fields with encoded information encoded within continuously or at fixed time intervals.

The above procedure describes the initial set up for the actual method of the present invention. In operation the method according to an aspect of the present invention includes the user measuring the radio signal power of each of three or more WAPs or transmitters. The User simultaneously receives and decodes the protocol field or fields containing the k parameter and three dimensional spatial coordinates of each of the WAPs or transmitters.

The user can then estimate his or her distance to each of said APs or transmitters based on isotropic spherically symmetric energy propagation (one over r-squared law) based on the radio signal power measured and the k parameter for each WAP or transmitter previously decoded.

The user can then calculate the parameters of the spheres of constant ratio of distances for each unique pair of said APs and transmitters utilizing the distance estimates based on isotropic spherically symmetric energy propagation and the spatial coordinates of said WAPs or transmitters. The parameters calculated consist of the three spatial coordinates of the center of each of said spheres of constant ratio of distances and the radius of each of said spheres of constant ratio of distances.

The user determines the best estimate of his or her position by minimizing the difference between the distance from the estimate of user's position and the center of the spheres of constant ratio of distances determined above and the radius of each of said spheres of constant ratio of distances.

As a first step, the general equations for fixing the position of a receiver using the ratio of distance measurements is shown. These distances are based on RSS from a set of transmitters at known reference points. The following are assumptions about the signal propagation.

The equation for distance:

$$d_i^2 = (x_i - x_0)^2 + (y_i - y_0)^2 + (z_i - z_0)^2 \quad (1)$$

where $(x_0, y_0, z_0)$ is the unknown position of the receiver, $(x_i, y_i, z_i)$ is the known position of the i-th transmitter, and $d_i$ is the unknown but measurable distance between them. Generically we can expect the signal strength, or power, to be expressible as a function of distance. That is $$P_i = f(d_i; \rho_i).$$

for the i-th measurement where $\rho_i$ is the set of parameters describing the transmitter. The function $f(d; \rho)$ describes the propagation of the signal. Now we can express distance as a function of power as $$d_i = f^{-1}(P_i; \rho_i)$$

where $f^{-1}$ is the function inverse.

The ratio of two distance measurements is as follows:

$$\frac{d_i}{d_j} = \frac{f^{-1}(P_i; \rho_i)}{f^{-1}(P_j; \rho_j)}.$$

Multiplying both sides by dj and squaring we have $$d_i^2 = d_j^2 \left( \frac{f^{-1}(P_i; \rho_i)}{f^{-1}(P_j; \rho_j)} \right)^2.$$

Now utilizing Equation (1)

$$(x_i - x_0)^2 + (y_i - y_0)^2 + (z_i - z_0)^2 = \begin{pmatrix} (x_j - x_0)^2 + \\ (y_j - y_0)^2 + \\ (z_j - z_0)^2 \end{pmatrix} \left( \frac{f^{-1}(P_i; \rho_i)}{f^{-1}(P_j; \rho_j)} \right)^2$$

After gathering terms and completing the square once each for $x_0$, $y_0$, and $z_0$, we have $$(x_0 - x_{cij})^2 + (y_0 - y_{cij})^2 + (z_0 - z_{cij})^2 = d_{cij}^2 \quad (2)$$

where $$x_{cij} = \frac{x_i - Q_{ij} x_j}{1 - Q_{ij}} \quad (3)$$

$$y_{cij} = \frac{y_i - Q_{ij} y_j}{1 - Q_{ij}}$$

$$z_{cij} = \frac{z_i - Q_{ij} z_j}{1 - Q_{ij}}$$

$$d_{cij}^2 = \frac{Q_{ij} d_{ij}^2}{(1 - Q_{ij})^2}$$

The squared ratio of the distances, or inverted propagation functions are as follows:

$$Q_{ij} = \left( \frac{d_i}{d_j} \right)^2 \quad (4)$$

$$= \left( \frac{f^{-1}(P_i; \rho_i)}{f^{-1}(P_j; \rho_j)} \right)^2$$

Equation (2) is the equation of a sphere. The unknowns are the position of the receiver, $(x_0, y_0, z_0)$, which describe a point on the surface of the sphere.

By noting that $$Q_{ji}^{-1} = Q_{ij}$$

it can be seen that equations (3) and equation (4) are invariant under the swap i→j and j→i; so more generally, with N measurements the position of the transmitter is at the intersection of the $$N = \frac{n(n-1)}{2}$$

unique spheres. Location estimation using these spheres of constant ratio of distances then constitutes finding their intersection, or the best fit.

The Cartesian coordinate system can be translated or rotated such that any point lies on the origin, and any other point lies on the x-axis. If a transformation is completed such that the point $x_j$ is at the origin and the point $x_i$ is on the x-axis, the sphere has its center at $$x_{cij} = \frac{x_i}{1 - Q_{ij}}$$

which demonstrates that the center of the sphere of constant ratio of distances lies on the line connecting the two reference points. Furthermore it can be noted that $$d_{cij} = \sqrt{Q_{ij}} |x_{cij}|.$$

and that the distance between the point xi and the sphere center is $$|x_i - x_{cij}| = Q_{ij} |x_{cij}|.$$

Now if $Q_{ij} > 1$ then $x_{cij}$ has the opposite sign of $x_i$, and $|xc_{ij}| < d_{cij} < |x_i - x_{cij}|$, so the sphere intersects the line connecting reference points $x_i$ and $x_j$ between the two points. Similarly if $Q_{ij} < 1$ then $|xc_{ij}| > |x_i|$ and is on the same side of the origin as $x_i$. It then follows that $|x_i - x_{cij}| < d_{cij} < x_{cij}$ so the sphere again intersects the connecting line between the two reference points.

Based on these two cases, the center of the sphere of constant ratio of distances is never between the two reference points (or transmitters). The case $Q_{ij} = 1$ was left out of the previous discussion, but that corresponds to a straight line perpendicular to the connecting line between the reference points, intersecting at the midpoint. This clearly does not invalidate the conclusions.

Equation (2) can be used to determine the most likely location, $(x^*, y^*, z^*)$, in the presence of measurement errors. The error between a location and the set of possible locations defined by a pair of signal strength measurements can be expressed as a difference in distances:

$$\Delta d_{ij} = \sqrt{(x_{c_{ij}} - x)^2 + (y_{c_{ij}} - y)^2 + (z_{c_{ij}} - z)^2} - \sqrt{d_{c_{ij}}^2}. \quad (5)$$

The sum of squared errors for all measurements is then minimized:

$$(x^*, y^*, z^*) = \arg\min_{(x,y,z)} \sum_{i=1, j=i+1}^{i=N-1, j=N} (\Delta d_{ij})^2 \quad (6)$$

using any of the standard techniques for nonlinear least squares minimization.

A model for the propagation of radio signals, such as those radio signals employed by the present invention, and for example those radio signals employed by the 802.11 wireless networking protocol, will be described next. The model to be developed here is based on the well known log-distance and partition loss models.

In free space an isotropic radiator follows the Friis free space equation $$P_r(d) = \frac{P_t G_t G_r \lambda^2}{(4\pi)^2 L d^2} \quad (7)$$

where $P_r$ is received power, $P_t$ is transmitted power, $G_t$ and $G_r$ are the transmitter and receiver gains, $\lambda$ is the wavelength, and L is a non-propagation loss factor. Next define a single parameter k for the transmitter by measuring $P_r$ at a reference distance $$P_r(d; k) = \frac{P_r(d_0) d_0^2}{d^2} = \frac{k}{d^2}. \quad (8)$$

Now $$d^2 = \frac{k}{P_r}$$

And $$Q_{ij} = \left(\frac{k_i}{k_j}\right)\left(\frac{P_{rj}}{P_{ri}}\right).$$

This estimate of $Q_{ij}$ does not depend on the characteristics of the receiver, but only on the ratio of $k_i$ to $k_j$. This then imposes the only calibration requirement of this method—the transmitter parameter k must be reported such that it is in the correct ratio to that of other transmitters.

Indoor propagation is illustrated by the following:

$$\hat{P}_r[dBm] = P_r(d_0)[dBm] - 10n\log\left(\frac{d}{d_0}\right) - \sum_w^W PAF_w \quad (9)$$

where $\hat{P}_r$ is measured received power (the RSS in the 802.11 protocol), n is the propagation exponent (which replaces 2 in the Friis model), and $PAF_w$ is the attenuation factor for partition w, which could be any general obstruction including walls and floors. The hat notation ^ will be used to denote measured quantities (as opposed to theoretical or calculated) and the [dBm] indicates that this is a logarithmic expression with units of decibels relative to 1 mW.

Upon switching to units of mW this becomes $$\hat{P}_r[mW] = \frac{k}{d^n 10^\beta} = \frac{P_r(d; k, n)}{10^\beta}.$$

where $$\beta = \frac{\sum_w^W PAF_w}{10}.$$

Now the measured distance ratio is $$\hat{Q}_{ij} = \left(\frac{k_i \hat{P}_{rj}}{k_j \hat{P}_{ri}}\right)^{\frac{2}{n}} \quad (10)$$

and so $$\hat{Q}_{ij} = \left(\frac{k_i 10^{\beta_j} P_{rj}}{k_j 10^{\beta_i} P_{ri}}\right)^{\frac{2}{n}}$$

Now define this in terms of the propagation error $$\hat{Q}_{ij} = \varepsilon_{ij} Q_{ij} \quad (11)$$

where $$\varepsilon_{ij} = 10^{\frac{2}{n}(\beta_j - \beta_i)}.$$

This error depends only on the difference in the propagation paths. This is the principle result of this analysis. It shows that even under significant attenuation in the propagation paths due to various obstructions, the estimated ratio of the distances to the transmitters can still be relatively accurate if the two propagation paths are similar.

A comparison of equations (7), (8). and (10) yields that this result minimizes any calibration effort required. The receiver gain is constant for both power measurements, and as long as the ratio of the k parameters is correct no absolute accuracy in the power (or RSS) measurements is required.

This method of the present invention opens the possibility of extending the 802.11 protocol to support positioning services by allowing each transmitting device to provide its power (k) and its position. This can be done using existing fields, but ideally new fields will be added. A very close analogy is the transmission of satellite ephemeris data in the GPS system. Such an extension to the 802.11 protocol would allow any mobile client to calculate its own position using only the received signals at that position, with no other knowledge of its environment.

Such an extension can implemented using the SSID. As described in [10], this is 32 ASCII octets. The parameter k, and the position $(x_0, y_0, z_0)$ of each transmitter can be encoded within the SSID string for each access point, which then broadcasts this string as part of its otherwise normal operation. In typical consumer devices the SSID can be set using an html configuration utility over an http connection to the device, which in practice limits the SSID to the printable characters.

An additional aspect of the present invention employs a method allowing for bit compression. Typically in order to display or transmit binary structures in printable character form, Base16 (Hexadecimal) notation is used. According to an aspect of the present invention, each four bit binary block within the binary structure is represented by one of the standard 16 hexadecimal characters (0-9, A-F).

A standard ASCII character is represented in 32 bits, but hexadecimal notation yields only 4 bits of resolution. In other words, the 16 possibilities (0-9, A-F) only represent four bits of data, yet require 32 bits to store.

The primary purpose of the B64 algorithms is to take advantage of some of the wasted space in a standard ASCII character Hexadecimal representation, to save 50% more binary data in the same amount of ASCII character space.

This is accomplished by using a Base64 (B64) notation, comprised of 64 standard printable characters (in order: 0-9, A-Z, a-z, $, &). This allows 6 bits of resolution per ASCII character, a gain (or compression rate) of 50%.

Although this aspect of the present invention provides for an address 32 bit native structure, the structures can be any length.

The method employs three basic parts, an ENCODE portion, a DECODE portion, and a CONVERT portion.

The ENCODE portion employs the following method: passing the list of numbers to be encoded one at a time to process A2 (below) until done, A2—Convert N to a string representation of the 32 bits, preserving the native structure, and append it to a resulting string, A3—Pass 6 bits at a time from the resulting string to process A4 (below) until done. Zero fill the end of the last pass if less than 6 bits remain, A4—Convert the 6 bits into a B64 character representation, and append to create a string of B64 characters, A5—Return the list of numbers in a B64 notation string of printable ASCII characters.

The DECODE portion continues this aspect of the present invention by passing the B64 notation characters one at a time to process B2 (below) until done. B2—Convert the B64 character to 6 bit binary string representation, and append it to a resulting string. B3—Pass 32 bits at a time to process B4 (below) until done. B4—Convert the 32 bits back to the native number structure and add to output array of numbers, this is further described in the CONVERT method below. B5—Return the array of number structures converted from B64 notation. The CONVERT portion includes passing 4 bits at a time and converting the 4 bits to standard hexadecimal representation and appending the resulting character string, then converting the hexadecimal character representation back to the original structure, and finally returning decoded N to the original binary format.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Also, the order of method steps may be rearranged. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method for determining a users position employing a wireless network, said method comprising:

providing an edifice containing the wireless network comprised of a plurality of wireless access points throughout the edifice;

providing a handheld device operable to transmit and receive transmissions from the plurality of wireless access points;

transmitting location information from the at least three wireless access points to the handheld device; receiving said transmitted location information at the handheld device;

processing said transmitted location information to determine location of handheld device within the edifice;

wherein said transmitted location information includes determining the three dimensional spatial coordinates of each network access point by using a floor plan of the edifice, determining the radio signal power of each network access point at a fixed predetermined distance, encoding said spatial coordinate information and radio signal power, transmitting said encoded spatial coordinate information and radio signal power at a fixed predetermined distance, receiving said encoded information, and decoding and comparing said information for each access point with measured radio signal power of that access point at the location of the handheld device, wherein GPS information is used to determine the three dimensional spatial coordinate of one or more of the access points, and wherein said encoding and comparing further comprising:

providing the measured radio signal power of two of the at least three access points and the predetermined radio power of each at a fixed predetermined distance to calculate a squared ratio of the estimated distances to two of the at least three access points being compared by the following, where $$Q_{ij} = \left(\frac{k_i}{k_j}\right)\left(\frac{P_{rj}}{P_{ri}}\right);$$

providing the squared ratio of the estimated distances to the two of the at least three access points being compared and the three dimensional spatial coordinates of the two of the at least three access points being compared to calculate the three dimensional coordinates of the center and the radius of a sphere forming the locus of all points where the ratio of the estimated distances is constant:

$$x_{cij} = \frac{x_i - Q_{ij}x_j}{1 - Q_{ij}}$$

$$y_{cij} = \frac{y_i - Q_{ij}y_j}{1 - Q_{ij}}$$

$$z_{cij} = \frac{z_i - Q_{ij}z_j}{1 - Q_{ij}}$$

$$d_{cij}^2 = \frac{Q_{ij}d_{ij}^2}{(1 - Q_{ij})^2};$$

providing these parameters to calculate the distance between a three dimensional spatial coordinate and the surface of the sphere defined by these parameters:

$$\Delta d_{ij} = \sqrt{(x_{c_{ij}}-x)^2+(y_{c_{ij}}-y)^2+(z_{c_{ij}}-z)^2} - \sqrt{d_{c_{ij}}};$$

determining the three dimensional spatial coordinates by minimizing the distance between a three dimensional spatial coordinate and the surface of the sphere and using the three dimensional coordinates as the estimate of the three dimensional spatial coordinates of the handheld device.

2. The method as claimed in claim 1, wherein said processing further comprises:
measuring radio signal power of the at least three wireless access points;
receiving spatial coordinates of the at least three wireless access points;
estimating the distance from the handheld device to the at least three wireless access points by processing the measured radio signal power and the received spatial coordinates;
determining the location of the handheld device within the edifice by comparing the estimated distance to the predetermined locations of the at least three access points within the edifice.

3. A system for determining a users position employing a wireless network, said method comprising:
an edifice containing the wireless network comprised of a plurality of wireless access points throughout the edifice operable to transmit and receive location information from the at least three wireless access points;
a handheld device operable to transmit and receive transmissions from the plurality of wireless access points and process said transmissions from the wireless access points to determine location information of the users within said edifice;
wherein said transmitted location information includes determining the three dimensional spatial coordinates of each network access point by using a floor plan of the edifice, determining the radio signal power of each network access point at a fixed predetermined distance, encoding said spatial coordinate information and radio signal power, transmitting said encoded spatial coordinate information and radio signal power at a fixed predetermined distance, receiving said encoded information, and decoding and comparing said information for each access point with measured radio signal power of that access point at the location of the handheld device,
wherein GPS information is used to determine the three dimensional spatial coordinate of one or more of the access points, and
wherein said encoding and comparing further comprising:
providing the measured radio signal power of two of the at least three access points and the predetermined radio power of each at a fixed predetermined distance to calculate a squared ratio of the estimated distances to two of the at least three access points being compared by the following, where $$Q_{i,j} = \left(\frac{k_i}{k_j}\right)\left(\frac{P_{r_j}}{P_{r_i}}\right);$$

providing the squared ratio of the estimated distances to the two of the at least three access points being compared and the three dimensional spatial coordinates of the two of the at least three access points being compared to calculate the three dimensional coordinates of the center and the radius of a sphere forming the locus of all points where the ratio of the estimated distances is constant:

$$x_{c_{ij}} = \frac{x_i - Q_{ij}x_j}{1 - Q_{ij}}$$
$$y_{c_{ij}} = \frac{y_i - Q_{ij}y_j}{1 - Q_{ij}}$$
$$z_{c_{ij}} = \frac{z_i - Q_{ij}z_j}{1 - Q_{ij}};$$
$$d_{c_{ij}}^2 = \frac{Q_{ij}d_{jj}^2}{(1-Q_{ij})^2}$$

providing these parameters to calculate the distance between a three dimensional spatial coordinate and the surface of the sphere defined by these parameters:

$$\Delta d_{ij} = \sqrt{(x_{c_{ij}}-x)^2+(y_{c_{ij}}-y)^2+(z_{c_{ij}}-z)^2} - \sqrt{d_{c_{ij}}};$$

determining the three dimensional spatial coordinates by minimizing the distance between a three dimensional spatial coordinate and the surface of the sphere and using the three dimensional coordinates as the estimate of the three dimensional spatial coordinates of the handheld device.

* * * * *